(12) United States Patent
von Matern

(10) Patent No.: US 11,300,409 B2
(45) Date of Patent: Apr. 12, 2022

(54) SURVEYING INSTRUMENT WITH OPTICAL STAGE COMPENSATING FOR TEMPERATURE VARIATIONS

(71) Applicant: Trimble AB, Danderyd (SE)

(72) Inventor: Johan von Matern, Danderyd (SE)

(73) Assignee: Trimble AB, Danderyd (SE)

( * ) Notice: Subject to any disclaimer, the term of this patent is extended or adjusted under 35 U.S.C. 154(b) by 967 days.

(21) Appl. No.: 16/006,596

(22) Filed: Jun. 12, 2018

(65) Prior Publication Data

US 2018/0292209 A1 Oct. 11, 2018

Related U.S. Application Data

(63) Continuation of application No. PCT/EP2015/079858, filed on Dec. 15, 2015.

(51) Int. Cl.
*G01C 15/00* (2006.01)
*G02B 7/00* (2021.01)
(Continued)

(52) U.S. Cl.
CPC ........... *G01C 15/002* (2013.01); *G01C 19/50* (2013.01); *G01S 7/4816* (2013.01); *G02B 7/008* (2013.01);
(Continued)

(58) Field of Classification Search
CPC . G01C 1/02; G01C 1/04; G01C 15/00; G01C 15/002; G01C 15/004; G01C 19/50;
(Continued)

(56) References Cited

U.S. PATENT DOCUMENTS 5,978,148 A 11/1999 Oono et al.
2002/0186479 A1 12/2002 Schoppach et al.
(Continued)

FOREIGN PATENT DOCUMENTS

CN 1928612 A 3/2007
CN 102522685 A 6/2012
(Continued)

OTHER PUBLICATIONS

English translation of EP2781933, machine translated on Aug. 9, 2021 (Year: 2014).*

(Continued)

*Primary Examiner* — Jie Lei
(74) *Attorney, Agent, or Firm* — Kilpatrick Townsend & Stockton LLP

(57) ABSTRACT

The present disclosure relates to a surveying instrument including a chassis, an optical system having an optical axis, a stage attached to the chassis and an optical component. The optical system may be adapted to receive and/or transmit light. The optical component is located at, or in proximity to, the optical axis. The received and/or transmitted light passes through the optical component. The stage includes an actuating member arranged to act on the optical component for movement thereof. The actuating member may be responsive to temperature so as to induce a displacement of the optical component relative to the chassis along the optical axis in response to a temperature change.

20 Claims, 6 Drawing Sheets

Figure 1A:
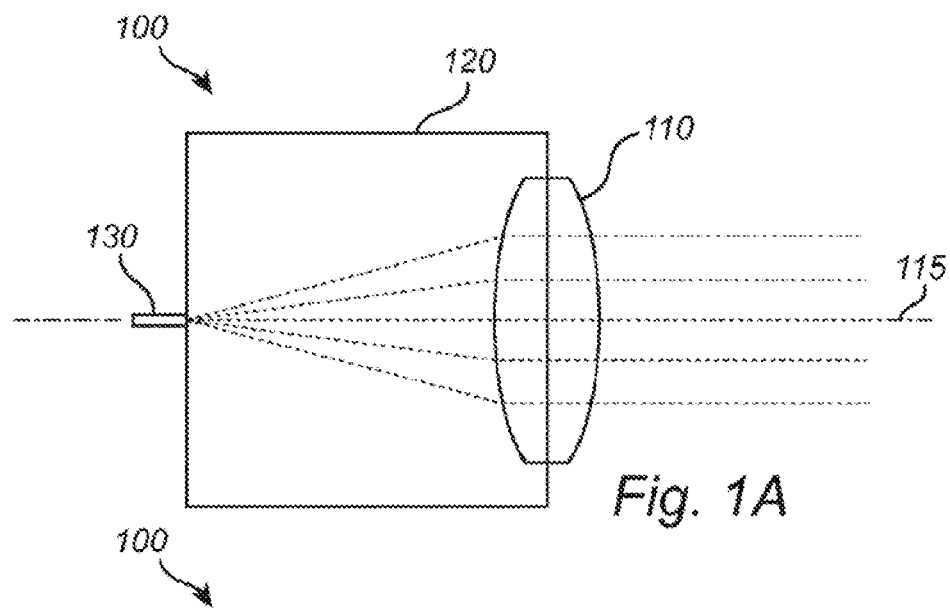

(51) Int. Cl.
 G01S 7/481 (2006.01)
 G01C 19/50 (2006.01)
 G02F 1/225 (2006.01)
(52) U.S. Cl.
 CPC ........ *G02F 1/2252* (2013.01); *G02F 2203/69* (2013.01)
(58) Field of Classification Search
 CPC . G01C 9/02; G02B 7/00; G02B 7/008; G02B 27/64; G02B 27/644; G02B 27/646; G02B 27/648; G02B 26/08; G02B 26/0875; G02F 1/2252; G02F 2203/69; G01S 7/481; G01S 7/4816; G01S 7/197; G01S 17/66; G01S 17/08; G01S 7/497
 USPC ....... 359/199.4, 198.1, 207.11, 210.1, 210.2, 359/822; 356/4.01, 3.02, 3.05; 33/281–286, 298
 See application file for complete search history.

(56) References Cited

U.S. PATENT DOCUMENTS

2012/0014564 A1  1/2012  Jensen
2014/0304994 A1  10/2014  Dumoulin

FOREIGN PATENT DOCUMENTS

| | | |
|---|---|---|
| CN | 103499034 A | 1/2014 |
| CN | 103926654 A | 7/2014 |
| CN | 103995166 A | 8/2014 |
| CN | 104101999 A | 10/2014 |
| CN | 104166217 A | 11/2014 |
| DE | 196 51 614 A1 | 6/1998 |
| DE | 10 2013 102 741 A1 | 9/2014 |
| EP | 2 781 933 A1 | 9/2014 |
| JP | H-08247762 A | 9/1996 |
| JP | 2007-134852 A | 5/2007 |
| JP | 2008-151618 A | 7/2008 |
| JP | 2010-096631 A | 4/2010 |
| JP | 2011-150005 A | 8/2011 |
| JP | 2012-108009 A | 6/2012 |
| WO | 01/06294 A1 | 1/2001 |

OTHER PUBLICATIONS

International Search Report and Written Opinion for PCT/EP2015/079858, dated Oct. 10, 2016, 7 pages.
International Preliminary Report on Patentability for PCT/EP2015/079858, dated Apr. 16, 2018, 30 pages.

* cited by examiner

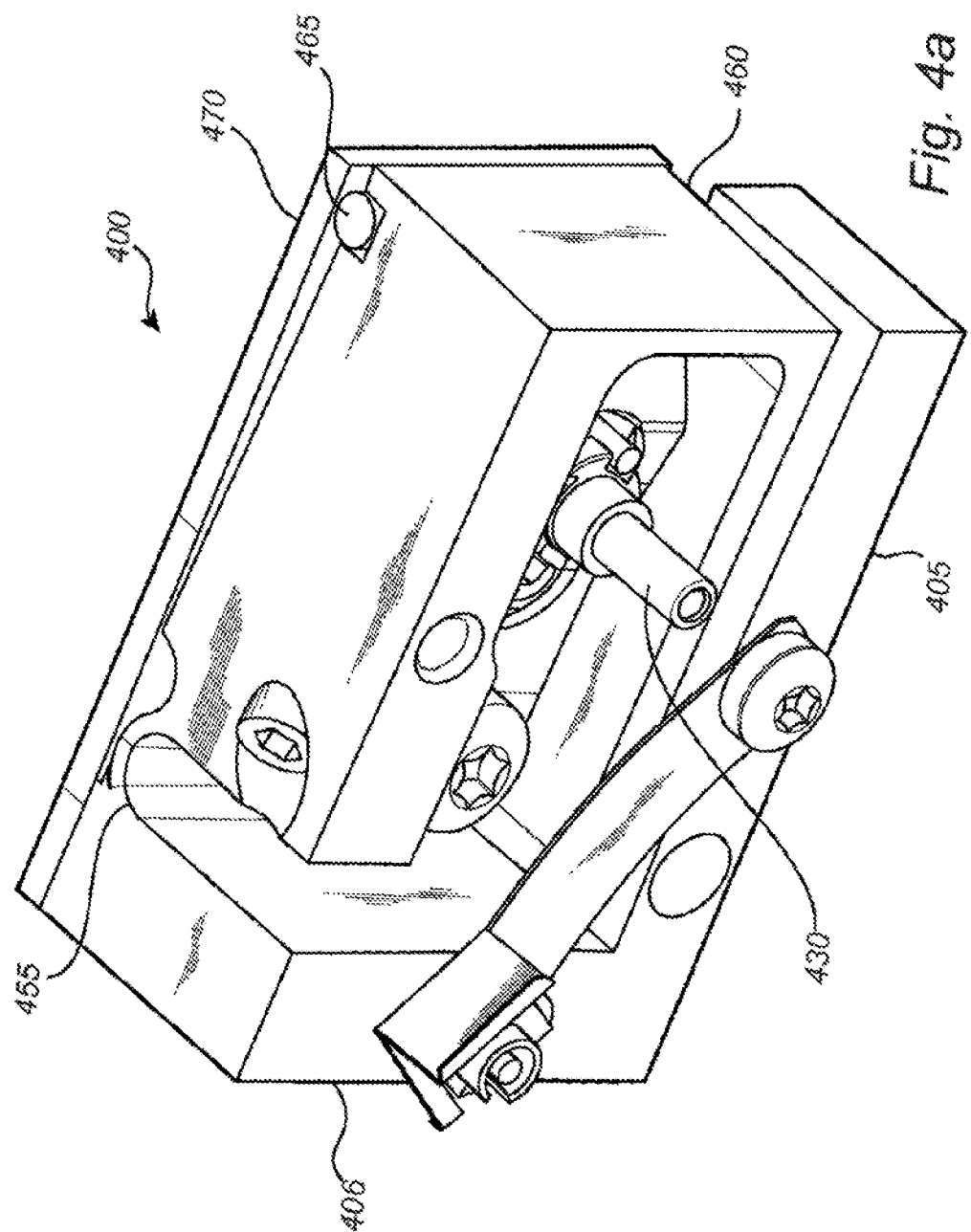

SURVEYING INSTRUMENT WITH OPTICAL STAGE COMPENSATING FOR TEMPERATURE VARIATIONS

CROSS REFERENCE TO RELATED APPLICATION(S)

This application is a continuation of International Application No. PCT/EP2015/079858, filed Dec. 15, 2015, the contents of which are incorporated herein by reference in their entirety for all purposes.

TECHNICAL FIELD

The present disclosure generally relates to the field of surveying. In particular, the present disclosure relates to surveying instruments configured to determine a distance to a target.

BACKGROUND

In the art of surveying, the positions of objects are determined by measuring angles and distances. For this purpose, a surveying or geodetic instrument includes an electronic distance measuring device (EDM) that may use different techniques to estimate a distance between the EDM itself and a target object. One such technique is the so called "time-of-flight" method, wherein the distance to a target object is estimated by measuring the round-trip of an optical pulse of light. Using an optical source, such as a laser, an optical pulse is emitted towards the target with the hope that at least some part of the pulse will be reflected at the target and return back to the measuring device, from which the pulse was emitted, where the pulse is then detected by a photodetector. If the time it takes for the optical pulse to travel to and back from the target object is accurately measured, a good estimate of the distance to the target object may be calculated.

If optical pulses are emitted in several directions, the distances to several points on an object may be determined. If the angle of emission for each pulse is well controlled (either by rotating the EDM or the geodetic instrument itself, or by e.g. using mirrors to deflect the emitted optical pulses in known directions), a mapping between distances and emission angles may be created and used in order to build a three-dimensional map of the surface of the object. In this way, the geodetic instrument may function as a three-dimensional (3D) scanner.

As the difference in optical properties (such as reflectivity) between different points (or regions) on the target object may be large, the respective returned (reflected) optical pulses may differ in terms of e.g. magnitude and the receiving end of the EDM is required to have a relatively high dynamic range in order for it to be able to detect incoming optical pulses of varying characteristics.

A challenge in the present technical field is to provide a geodetic instrument with a more stable dynamic range.

SUMMARY

An object of the present disclosure is therefore to at least partially fulfill the requirements specified above. To achieve this, a surveying instrument as defined in the independent claim is provided. Further embodiments are defined in the dependent claims.

According to some embodiments, a surveying instrument is provided. The surveying instrument includes a chassis, an optical system having an optical axis, a stage attached to the chassis and an optical component. The optical system may be adapted to receive and/or transmit light (such as e.g. an optical pulse of light or a light beam). The optical component is located at, or in proximity to, the optical axis. The received and/or transmitted light may pass through the optical component. The stage includes an actuating member arranged to act on the optical component for movement thereof. The actuating member may be responsive to temperature so as to induce a displacement of the optical component relative to the chassis along the optical axis in response to a temperature change.

It has been realized that the dynamic range of a surveying instrument may be altered and, in particular, reduced because of temperature changes. A temperature change may for example alter the electronics of the receiver, such as for instance an amplifier or an attenuator, thereby affecting the dynamic range of the surveying instrument. Further, a temperature change may cause an expansion of the instrument's chassis to which optical elements are attached and consequently alter the structural and/or optical arrangement of these various optical elements, thereby affecting also the amount of light received at the receiver of the instrument. In particular, the position (along the instrument's optical axis) of the optical component relaying light (such as e.g. an optical pulse) reflected at a target to the receiver (i.e. the position of the optical component through which the received light passes) may be changed because of a temperature increase or decrease, thereby affecting the amount of light that is received at the receiver from the optical component. Similarly, the position (along the instrument's optical axis) of the optical component relaying light (such as e.g. an optical pulse) transmitted to the target (i.e. the position of the optical component through which the transmitted light passes) may be changed because of a temperature increase or decrease, thereby affecting the amount of light that is transmitted from the instrument which in turn affects the amount of light that is received at the receiver.

It will be appreciated that in the present disclosure it may sometimes be described that the optical component may transmit received light or a received optical pulse (i.e. light reflected at a target) to the receiver. In this case, the term "transmit" may refer to the internal transmission within the geodetic instrument of the light from the optical component to the receiver. It may interchangeably be described that the optical component relays the received light to the receiver as the received light passes through the optical component.

Analogously, it may also be described that the optical component may receive transmitted light (or a transmitted optical pulse or a transmitted light beam) in that it may receive it from e.g. an optical light source and then transmit it to another optical element of the surveying instrument such that it is transmitted from the surveying instrument. It may interchangeably be described that the optical component relays light emitted from the light source as the emitted light passes through the optical component.

In general, light received by the surveying instrument, e.g. light that has been reflected at a target, is referred to as the received light. Further, light transmitted from the surveying instrument (i.e. out of the instrument) is referred to as the transmitted light.

In an embodiment, the surveying instrument may further comprise a receiver configured to receive the received light via the optical component. In addition or alternatively, the surveying instrument may further comprise an optical light source configured to emit light to be transmitted via the optical component. In other words, a stage with an actuating member for displacement of the optical component in response to a temperature change may be arranged at the transmitting part of the surveying instrument, i.e. in connection to the light source, to regulate the amount of light transmitted from the surveying instrument and/or at the receiving part of the surveying instrument, i.e. in connection to the receiver, to regulate the amount of light received at the receiver of the surveying instrument. It will be appreciated that in some embodiments, the surveying instrument may be equipped with two separates stages, one at the receiving part and one at the transmitting part.

In traditional surveying instruments, a temperature change may affect both electronic components and the optical arrangement within the surveying instrument (or either one of these), thereby causing a change and, in particular, a reduction of the dynamic range of the surveying instrument. Some measurements made by the surveying instrument may therefore lead to for example saturation at the receiver or a weak amount of light (because the amount is too low in magnitude), which reduces the accuracy of the surveying instrument.

In the present embodiments, optical compensation for the temperature change is provided. The optical component is mounted on a stage attached to the chassis of the instrument and an actuating member of the stage being responsive to the temperature change is used to induce, relative to the chassis, a displacement (or motion) of the optical component arranged at, or in proximity to, the optical axis. With the present embodiments, a thermal expansion of the chassis because of a temperature change, which causes a motion of the optical system along the optical axis, is compensated for by a motion of the optical component along the optical axis thanks to the optical stage at which it is arranged, and in particular the actuating member of the stage as the actuating member is responsive to the temperature change.

With the present embodiments, a broader range of target reflectivity may be measured by the surveying instrument over a larger temperature range thanks to the introduction of the optical stage which causes a motion of the optical component via which the received light is transmitted to the receiver and/or via which the light is transmitted from the instrument. In other words, a more stable dynamic range is achieved and a more reliable surveying instrument is obtained.

In the present disclosure, the optical system of the surveying instrument may include an objective, a front lens or front lens assembly arranged at the front end of the surveying instrument. The optical system may however include many more lenses and optical elements such as prisms. In general, the front lens assembly is, in the transmit path (i.e. an optical path from a light source of the geodetic instrument towards the target), the optical group (or assembly) which includes the last optical element with a certain refractive property or effect (e.g. a diverging/converging lens) at which, or after which, a measurement beam (or an optical pulse) exits (or leaves) the surveying instrument. Analogously, the front lens assembly is the optical group (or assembly) which includes the first optical element with a certain refractive property (e.g. a diverging/converging lens) which the light reflected at the target (or measurement beam or reflected beam or reflected pulse of light) meets when entering, or after having entered, the surveying instrument. As mentioned above, the front lens assembly of the instrument may for example be a lens of the optical system. As mentioned above, it will be appreciated that the optical system may include other optical components.

Following a temperature change, the optical system of the surveying instrument may be displaced thereby changing the position of the focal point at which the optical pulse received by the optical system is focused. The optical system may be attached to the chassis and a temperature change causing a thermal expansion of the chassis will therefore cause a change of the position of the focal point of the optical system along the optical axis of the instrument. Similarly, the position of the optical component, if it was attached to the chassis, may also be displaced because of a change in temperature (i.e. because of an expansion of the chassis).

In the present embodiments, an optical stage is introduced in the surveying instrument to compensate for this change of the position of the focal point because of an expansion of the chassis. As described above, with the actuating member of the stage (at which the optical component receiving the light may be arranged either directly or via a movable part, as will be further explained in the following according to some embodiments), a motion of the optical component is induced in response to a temperature change, thereby resulting in the optical component being located at a desired position (which may in some embodiments be approximately the same position but not necessarily) along the optical axis relative to the optical system.

The amount of the displacement may be calibrated in order to compensate for any change in the electronics (e.g. a change in the amplification/attenuation of the electrical signal resulting from the received light) and/or any change in the optical arrangement (i.e. a change in the amount of light transmitted from the optical component to the receiver). In the present embodiments, optical compensation has been implemented to counteract a thermal expansion of the chassis because of a temperature change and/or any changes associated with the electronic part of the surveying instrument and affecting its dynamic range.

In the present disclosure, the chassis refers to the support, structure or body of the surveying instrument at which the optical system and the stage are attached.

In some embodiments, the optical axis of the optical system may correspond to the optical axis defined by a front lens of the optical system. The optical axis of the optical system may then define a line of sight of the surveying instrument, i.e. the direction at which the surveying instrument is pointing while performing a measurement. However, it will be appreciated that the optical system may include other optical elements, such as a tilted mirror optically located after the front lens relative to a received light or received optical pulse (i.e. within the surveying instrument and before the front lens relative to a transmitted light or transmitted optical pulse), whose center axis is not necessarily parallel with the center axis of the front lens.

In the present disclosure, the stage or optical stage, at which the optical component is arranged and via which the light received at the optical system is retransmitted to the receiver, may be a support, body or carriage at which the optical component is arranged (or attached).

The optical component may be arranged at, or in proximity to, the optical axis of the optical system. In some embodiments, the optical component is arranged at (or near) the focal point of a (front) lens of the optical system. The optical component may for example establish an optical connection between the optical system and a transmission line or optical waveguide (which may be an optical fiber) transmitting light received at the optical system to the receiver. In some embodiments, the optical component may be an optical fiber ferrule to which an optical fiber is connected for receiving and/or transmitting light. The optical fiber ferrule may be arranged to relay (or guide) light emitted by an optical light source to a front lens assembly for transmission from the surveying instrument or may be arranged to relay (or guide) light received at a front lens assembly of the surveying instrument to a receiver of the surveying instrument.

The receiver (or receiving unit or receiving means) may include a photodetector such as e.g. a photodiode (in particular an avalanche photodiode) for detecting the light (e.g. an optical pulse) received at the optical system and transmitted via the optical component. The receiver may be configured to convert the received light into an electric signal. The electric signal may then be used by the receiver, or a processor connected to the receiver, for determining a distance to the target at which the light has been reflected. In particular, the processor may be configured to determine a time of reception of an optical pulse of light. It will be appreciated that the receiver may include more components than the photodetector itself, such as e.g. an amplifier or an attenuator.

Analogously, the optical component may for example establish an optical connection between the optical system and a transmission line or optical waveguide (which may be an optical fiber) guiding the light (e.g. an optical pulse) received at the optical system from the light source. In some embodiments, the optical component may be an optical fiber ferrule to which an optical fiber is connected for transmitting light emitted at the optical light source.

With the term temperature change is meant a change in temperature such as e.g. a temperature increase or a temperature decrease. In the context of the present disclosure, the temperature change may be of some degrees to tens of degrees. The surveying instrument may be subject to temperature variation from minus thirty degrees Celsius (−30° C.) to plus seventy degrees Celsius (70° C.), i.e. a temperature change of one hundred degrees Celsius in total. It will be appreciated that while a temperature increase causes the optical component to move in one direction along the optical axis, a temperature decrease causes the optical component to move in the opposite direction. Because of temperature changes during a measurement procedure (such as a scan for instance), the temperature may vary with some degrees only and the optical component may move back and forth depending on whether the temperature slightly increases or decreases.

For illustrative purposes only, the optical component may be an optical fiber ferrule and may be configured to move by approximately five micrometers each degree Celsius (5 μm/° C.). A complete movement (or translation) for one hundred degrees may therefore amount to approximately five hundred micrometers (500 μm, i.e. 0.5 mm) along the optical axis (which may be considered to be the longitudinal direction). If the optical component is arranged to input (or transmit) light into an optical fiber having a diameter of about hundred (100) micrometers, the movement of the optical component may preferably not exceed approximately five (5) degrees in a lateral direction (a direction perpendicular to the optical axis) such that a reasonable amount of light reaches the optical component. It will be appreciated that different accuracies and tolerances may be used depending on the type of optical component.

It will be appreciated that in the present embodiments the stage may be designed such that the displacement of the optical component provided by the stage does not compensate in full for the misplacement of the optical component along the optical axis because of the thermal expansion of the chassis since there may be other elements in the surveying instrument, such as electronic components (e.g. an amplifier or attenuator), which may also be affected by a temperature change. The actuating member of the stage may not only compensate for the displacement of the optical component along the optical axis due to thermal expansion of the chassis but also for any other changes in the receiver (or electronic components of the receiver). The present embodiments provide the advantage of controlling, via the displacement of the optical component by the actuating member, the amount of light that will be transmitted to the receiver.

In some embodiments, the optical component may be directly attached to the actuating member.

In some other embodiments, the stage may further comprise a movable part and the optical component may be attached to the movable part. The actuating member may then be arranged to act on the movable part for movement thereof. In other words, the optical component may be attached to a movable part, on which the actuating member is arranged to act, in order to induce a motion (or movement) of the optical component along the optical axis. In such embodiments, the stage includes at least two elements, an actuating member and a movable part. The optical component is attached to the movable part and the actuating member is sensitive to a temperature change such that it causes a motion of the movable part and thereby a motion of the optical element.

As will be further described in some of the following embodiments, different mechanical arrangements of the movable part and the actuating member may be envisaged.

In some embodiments, actuation by the actuating member may be caused by a mechanical deformation of the actuating member in response to the temperature change, thereby causing the displacement of the optical component. In other words, the actuating member may be arranged or configured to cause the displacement of the optical component, by a mechanical deformation of its own body.

In some embodiments, the mechanical deformation may be at least one of a bending or an expansion of the actuating member. In a first alternative, the actuating member may be arranged to vary its bending upon a temperature change. The change of the bending of the actuating member may cause the optical component to move if it is directly attached to it. If the optical component is attached to a movable part, the change of the bending of the actuating member may cause the movable part to be pushed (or displaced) by the actuating member, which thereby causes a motion of the optical component.

In a second alternative, the actuating member may expand in at least one direction and may be brought into contact with the optical component, or a movable part at which the optical component is attached, in order to push (or displace) it. Depending on the mechanical arrangement between the actuating member and the movable part and, in particular, the location of a contact point between the actuating member and the movable part, the change of the bending (or the expansion) of the actuating member may cause a translation or a more complex movement (e.g. including a swing) of the movable part.

According to an embodiment, the stage may include a base with a flexible section (or hinge) securely attached to the base, the movable part being an arm arranged to swing on the flexible section upon actuation by the actuating member. In the present embodiment, the optical component will experience a swing as it is attached to (or mounted on)

the movable part. With the present embodiment, the motion of the optical component is provided in at least one direction.

In some embodiments, the optical component may be attached at an extremity of the movable part opposite to the extremity attached to the hinge such that its motion may be almost linear (straight). It will be appreciated that if the optical component is arranged at a large distance from the rotation center of the swing in relation to the displacement (arc of a circle) caused by the swing, the displacement may be considered to be a translation (along the optical axis of the optical system).

According to an embodiment, the actuating member may be a plate extending along the arm. For example, the stage may include an arm at which the optical component is mounted and a plate which may be mechanically deformable, in particular having a variable bending, in response to a temperature change. As the plate extends along the arm, the plate is arranged to apply a variable force (or pressure) on the arm depending on its bending.

In one example, the plate may include an opening for connecting an optical fiber to the optical component. The optical component may be located within this opening, which may be advantageous in that it provides a more compact design and possibly also result in a more stable construction. In particular, placing the optical component closer to the flexible section (or hinge), as compared to a contact point of the actuating member on the movable part provides also leverage, which may be beneficial in that the contact point has less impact on the motion of the optical component.

According to an embodiment, the stage may include a track extending along, or in proximity to, the optical axis, wherein the movable part is arranged to glide on the track upon actuation by the actuating member. In this embodiment, the stage may be equipped with a track. In one example, the movable part may be arranged to glide, and in particular to translate, on the track upon actuation by the actuating member. The present embodiment is an alternative to the mechanical arrangement described in some of the preceding embodiments, wherein the stage includes a hinge and an arm arranged to swing on the hinge.

According to an embodiment, the optical component may be mounted on the movable part in proximity to at least one contact point at which the actuating member engages with the movable part. The present embodiment is particularly advantageous in the case of a stage including a flexible section (or hinge) and an arm arranged to swing on the flexible section such that the optical component is arranged at a large distance from the rotation center of the swing in relation to the displacement (arc of a circle) caused by the swing. As a result, the motion of the optical component may be mainly a translation along the optical axis of the optical system. It will be appreciated that while it is sometime referred to a hinge in the present specification, the hinge may not necessarily be a traditional hinge having several parts (cylindrical and pin) that are assembled together and has surfaces gliding against each other, but instead may be a single part designed as hinge, which renders the stage more mechanically stable and precise as the number of parts to be machined is reduced.

According to an embodiment, the actuating member may include at least one of a bimetal, a trimetal, a tetrametal, a material including at least two thermally expandable layers of different materials, or an arrangement including at least two thermally expandable elements of different materials. The different materials may be materials having two different expansion coefficients. In this embodiment, the actuating member may be composed of at least two separate thermally expandable layers joined (or bonded) together. The actuating member may for example be a bimetal which is composed of two separate metal layers joined together. The actuating member may also be a trimetal or a tetrametal which may be composed of three or four separate metal layers, respectively.

By way of examples and for illustrative purposes only, the bimetal may be made of one layer of iron and another separate layer of brass or any other combinations such as steel and copper or steel and brass or even two layers of two different steel alloys. Other material combinations (in particular combination of metal layers) may be envisaged. Further, the number of expandable layers joined together to form the actuating member may also be varied. The actuating member may for example be a plate or a strip, i.e. the actuating member may be elongated (extending mainly in one direction and being rather narrow). Further, the actuating member may be thin since the thinner the actuating member is then the tighter the bending radius is.

Using such materials, the bending of the actuating member may be varied upon a temperature change because of the difference in thermal expansions between the two (or more) layers joined together. In particular, the different expansions force the actuating member to bend in one direction if heated, and in the opposite direction if cooled below its initial temperature. The material (metal) with the higher coefficient of thermal expansion is on the outer side of the curve when the actuating member is subject to a temperature increase relative to its initial temperature and on the inner side when it is subject to a temperature decrease in comparison to its initial temperature. The actuating member may therefore be configured to bend back and forth when the surrounding temperature changes. Such materials (i.e. like bimetals) present very little hysteresis, which results in a more reliable surveying instrument.

In some embodiments, the actuating member may be an arrangement including at least two thermally expandable elements of different materials, wherein the different materials may have two different expansion coefficients.

According to an embodiment, the actuating member may be arranged to permanently apply a force on the movable part (or vice versa). In particular, the movable part may be spring loaded such that it is pushed against the actuating member. This may be achieved by designing the geometries of the actuating member and the movable part so that they are under constant tension against each other during the whole translation range.

The actuating member may for example have a permanent contact point (or contact area) with the movable part. This may be obtained by providing a protuberance (or notch or indentation) at the actuating member or the movable part. As a result, the effect of backlash may be reduced. Further, a deformation of the actuating member in response to a temperature change will either provide an increase or a release (decrease) of an already applied force on the movable part, thereby improving the control of the motion of the movable part and thereby of the optical component.

According to a more specific example, the actuating member may be arranged to engage with the movable part at at least one contact point. The actuating member may extend between a first extremity being securely attached to the stage and at least the at least one contact point. In the present example, the actuating member may extend from an extremity being securely attached to the stage and a contact point with the movable part. As the actuating member is responsive to temperature, the actuating member will induce a motion of the movable part via the contact point, which in turn will induce a displacement of the optical component (attached to the movable part) relative to the chassis along the optical axis in response to a temperature change. Other examples may however be envisaged wherein the movable part may be attached onto the actuating member or wherein the optical component is directly attached to the actuating member (the actuating member thereby acting as the movable part).

According to an embodiment, parameters of the actuating member may be calibrated to determine the amount of displacement of the optical component along the optical axis in response to a temperature change. In particular, the parameters may include at least one of material and dimensions of the actuating member. In particular, in case of an actuating member formed as a plate, the amount of the motion may depend on the width of the plate. The amount of displacement may be selected (or calibrated) depending on the general design of the actuating member, such as for instance the width of the actuating member and/or the size of the opening, if any, formed in the actuating member for insertion and connection of an optical fiber to the optical component. The desired amount of displacement (in terms of micrometers per degree of temperature change) may be obtained by changing the dimensions of an originally available (or commercially available) actuating member. For example, a bimetal plate initially providing a displacement of 10 μm/° C. may be designed (change of shape and dimensions) to finally provide 5 μm/° C.

According to an embodiment, the instrument may further comprise a center unit arranged to rotate relative to a base of the instrument. In this configuration, the optical system, the stage and the optical component may be arranged within the center unit. The surveying instrument may be a total station or a geodetic scanner. The position of a target at which the surveying instrument aims (i.e. the line of sight) may be selected by rotating the center unit but may also be obtained by means of a deflection element, such as a rotating mirror, arranged within the center unit.

In some other embodiments, the stage and the optical component may be arranged in an alidade of the geodetic instrument, the center unit being mounted on the alidade for rotation about a first (trunnion) axis and the alidade being mounted on the base for rotation about a second (azimuthal) axis. The first axis and the second axis may intersect each other and, in particular, may be orthogonal to each other.

In general, the instrument may comprise an optical light source configured to emit light which is then directed towards a target at which the light is reflected. The optical light source may be configured to emit optical pulses and/or a (continuous) beam of light. The optical light source may for example be a laser.

According to an embodiment, the instrument may further comprise a processor configured to determine a distance based at least on the received light. In particular, the processor may be configured to measure a time period between emission of light, such as an optical light pulse, (from the light source) and reception of light, such as a reflected optical light pulse, (at the receiver). The processor may be further configured to determine a distance based on the measured time period. Other methods than a method based on a measurement of time between transmission and reception may be employed, such as e.g. methods based on measurement of phase shifts.

The present disclosure relates to all possible combinations of features recited in the claims. Further, any embodiment described herein may be combinable with other embodiments also described herein, and the present disclosure relates to all combinations of features even if said features are recited in mutually different claims.

Further objects and advantages of the various embodiments of the present disclosure will be described below by means of exemplifying embodiments.

DRAWINGS

Figure 1B:
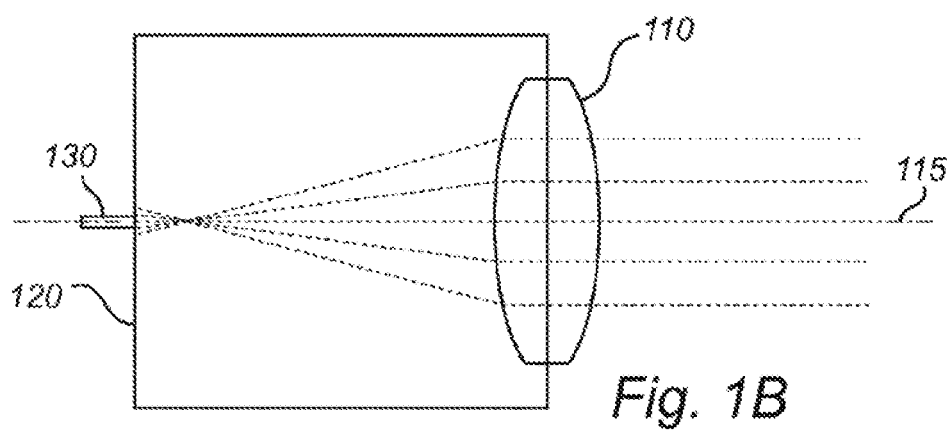
Figure 2:
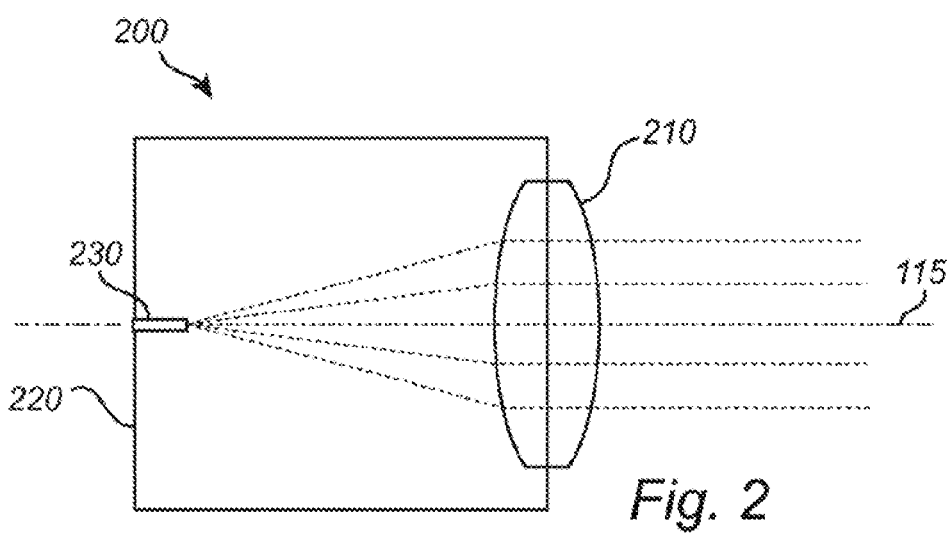
Figure 3A:
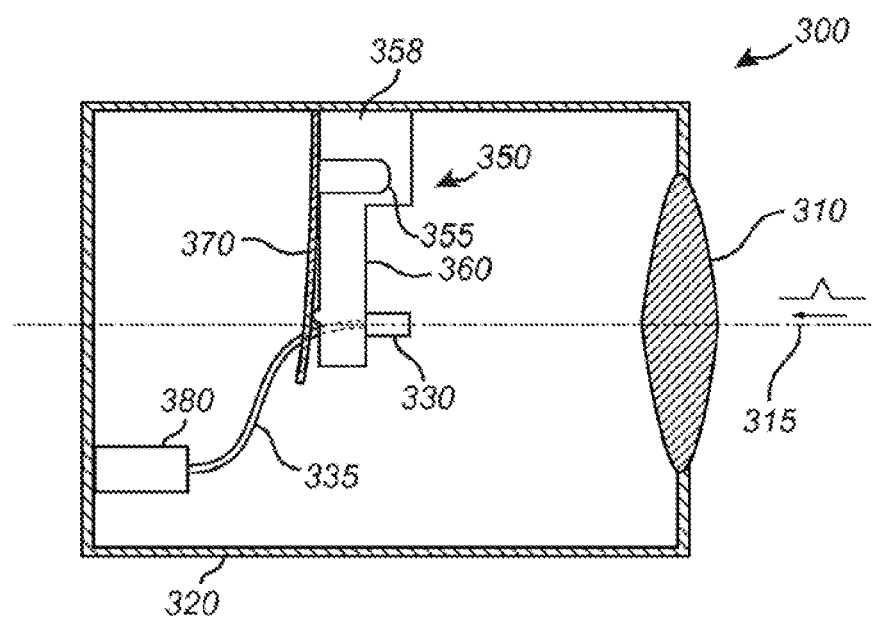
Figure 3B:
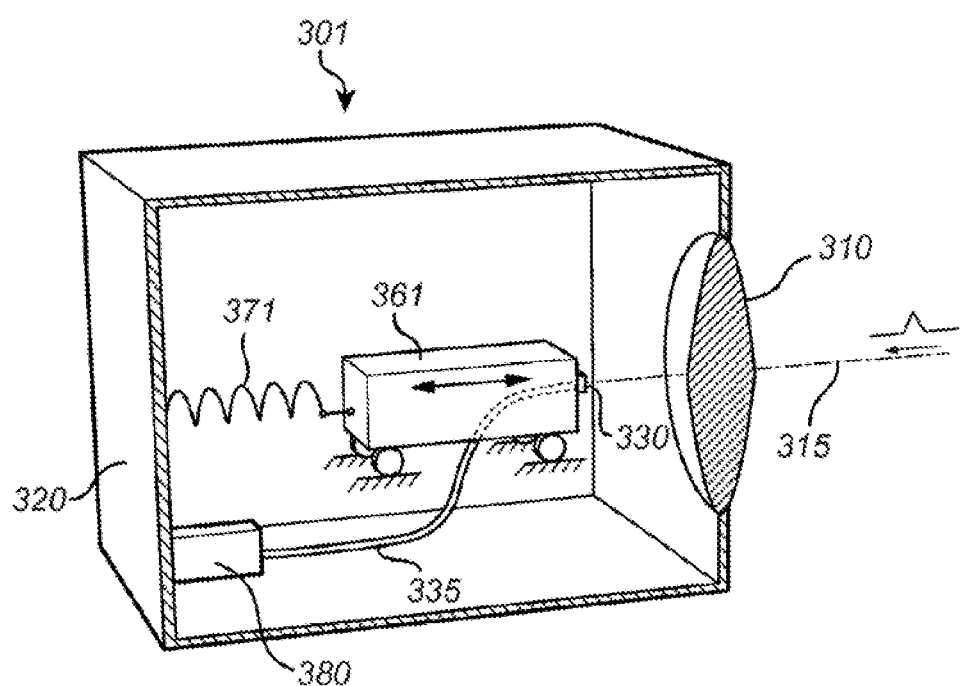
Figure 4B:
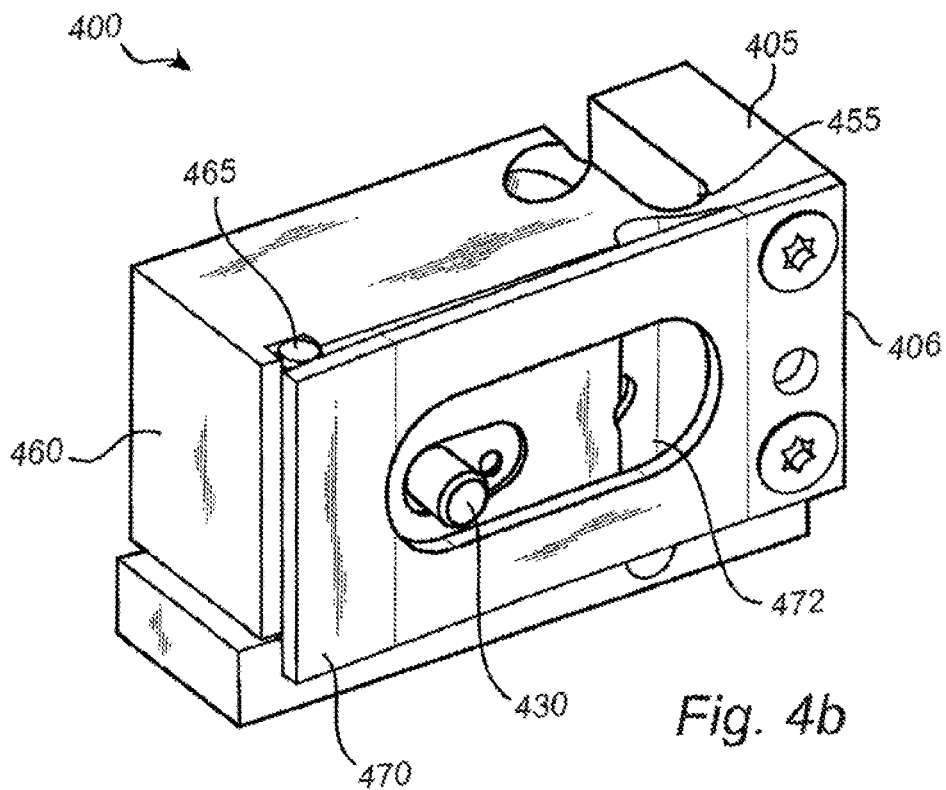
Figure 5:
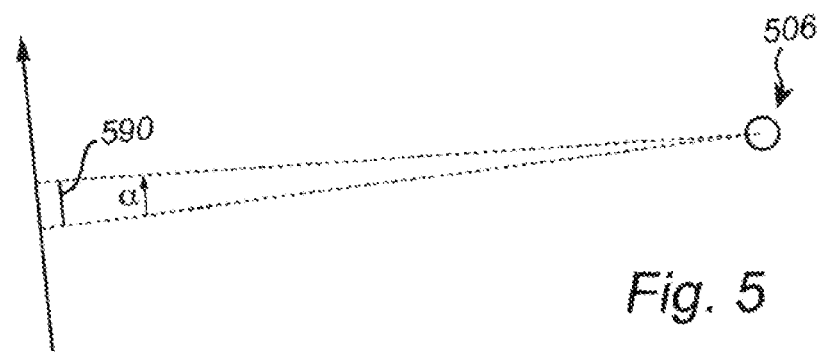
Figure 6:
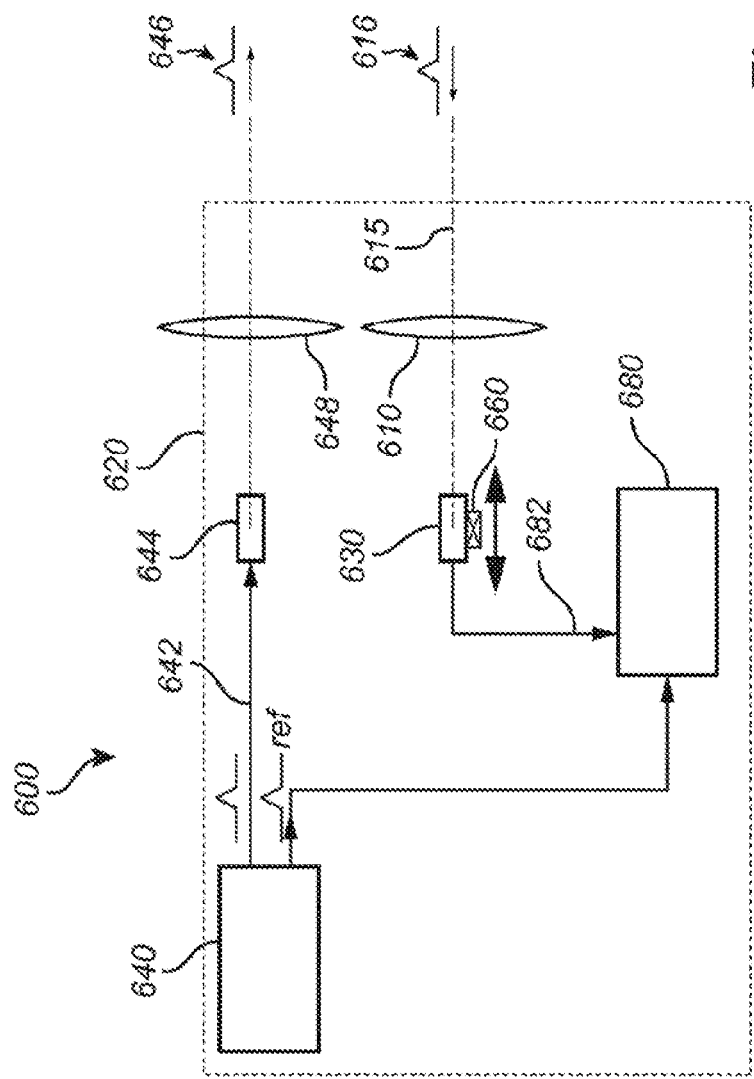
Figure 7:
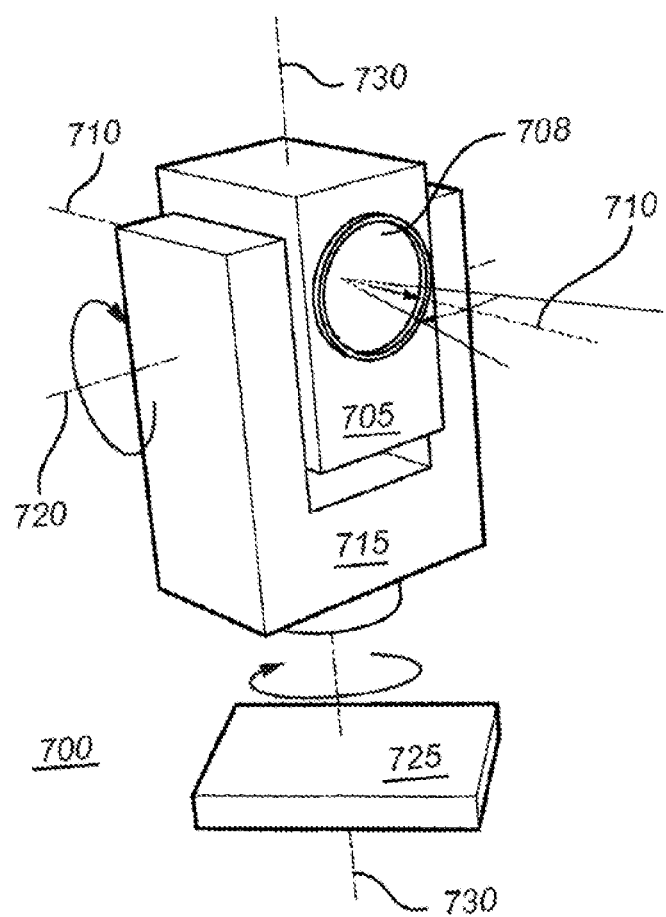

Exemplifying embodiments will now be described in more detail, with reference to the accompanying drawings in which:

FIGS. 1a and 1b schematically illustrate the effect of a temperature change on a surveying instrument;

FIG. 2 schematically illustrates the compensation for a temperature change as provided by an optical stage of a surveying instrument according to some embodiments;

FIG. 3a schematically shows a top view of a surveying instrument according to some embodiments;

FIG. 3b schematically illustrates an alternative arrangement of an actuating member and a movable part of a stage;

FIGS. 4a and 4b provide three-dimensional views of an optical stage of a surveying instrument according to some embodiments;

FIG. 5 schematically illustrates the motion provided by an actuating element according to some embodiments;

FIG. 6 schematically illustrates a surveying instrument according to some embodiments; and FIG. 7 is a general schematic view of a geodetic scanner according to some embodiments.

Unless explicitly stated to the contrary, the drawings show only such elements that are necessary to illustrate the example embodiments, while other elements, in the interest of clarity, may be omitted or merely suggested.

DETAILED DESCRIPTION

The present disclosure will now be described more fully hereinafter with reference to the accompanying drawings, in which exemplifying embodiments are shown. The invention may however be embodied in many different forms and should not be construed as limited to the embodiments set forth herein, and these embodiments are rather provided by way of examples.

With reference to FIGS. 1a and 1b, the effect of a temperature change on a surveying instrument 100 is illustrated.

The surveying instrument 100 includes an optical lens 110 having an optical axis 115 and a chassis 120. The surveying instrument also includes an optical component 130 attached to the chassis 120 of the surveying instrument 100. The optical lens 110 receives light and is configured to focus the received light at a focal point. In FIG. 1a, the optical component is arranged along the optical axis 115 of the optical lens 110 and at, or at least in proximity to, the focal point of the optical lens 110. The optical lens 110 therefore redirects (or converges) most of the light to the optical component 130.

Upon a temperature change, however, the chassis 120 may expand and the optical component 130 attached to it may be displaced such as illustrated in FIG. 1b. FIG. 1b shows the same surveying instrument as FIG. 1a except that the optical component has been displaced along the optical axis 115 as a consequence of the thermal expansion of the chassis 120 to which it is attached. As a result, the optical component 130 is no longer arranged at the focal point of the optical lens 110 and some of the light received at the optical lens 110 may not reach the optical component 130.

With reference to FIG. 2, the compensation for a temperature change as provided by an optical stage of a surveying instrument 200 according to some embodiments of the present disclosure is illustrated.

The surveying instrument 200 may be equivalent to the surveying instrument 100 except that the optical component 230 moves towards the optical lens 210 in response to a temperature change as it is mounted on an optical stage (not shown in FIG. 2), thereby compensating for an expansion of the chassis 220 upon the temperature change. As a result, the optical component 230 is still arranged at, or in proximity to, the focal point of the optical lens 210 and the amount of light focused at the optical component 230 by the optical lens 210 can be controlled.

The compensation effect illustrated in FIG. 2 may be provided by introducing an optical stage at which the optical component 230 is arranged, such as described with reference to e.g. FIGS. 3a, 3b, 4a and 4b in the following.

With reference to FIG. 3a, a surveying instrument according to some embodiments is described.

FIG. 3a is a top view of a surveying instrument 300 including an optical system 310 having an optical axis 315, a chassis 320, a stage 350 attached to the chassis 320, an optical component 330 and a receiver 380.

The optical system 310 may include a lens or a lens assembly configured to receive light and focus the received light at a focal point along the optical axis 315. FIG. 3a illustrates an optical pulse of light which may be received at the optical system 310. The optical pulse of light may be a pulse initially emitted from the surveying instrument 300 and then reflected back at a target (or object) at which the surveying instrument aims for measuring a distance to the target. This aspect will be described in more detail with reference to FIG. 6.

The received light pulse may be directed by the optical system 310 to an optical component 330 mounted on a stage 350. The stage 350 may include an actuating member 370 and, optionally, a movable part 360. The actuating member 370 may be arranged to act directly on the optical component 330 if the optical component 330 is directly attached to the actuating member. However, in the specific example shown in FIG. 3a, the actuating member 370 is arranged to act on the movable part 360 for moving it. The optical component 330 may be attached to the movable part 360 and located at, or in proximity to, the optical axis 315. It will be appreciated that the optical component 330 may not necessarily be arranged at the focal point of the optical system 310. As mentioned above, the stage 350 may be used to compensate for changes caused by both, or by either one of, a variation in one or more electronic components and a change of the optical arrangement of the optical component receiving the light pulse. Thus, the optical component 330 may be arranged along (or at least in proximity to) the optical axis 315 but not necessarily at the focal point in order to control the amount of light transmitted from the optical system 310.

The receiver 380 may be configured to receive the received optical pulse of light via the optical component 330. The optical component 330 may for example be an optical fiber ferrule at which an optical fiber 335 is connected for transmitting the received optical pulse from the optical fiber ferrule 330 to a photodetector (not shown) of the receiver 380. The photodetector may for example be a photodiode. The receiver may then convert the received optical pulse into an electric signal. The electric signal may then be used, either by the receiver 380 itself or a by a processor connected to the receiver 380, to determine a characteristic of the pulse. In particular, the reception time of the received optical pulse may be determined and then compared to an emission time of the pulse such that the travel time of the optical pulse, i.e. the time it takes for the pulse to travel from the surveying instrument to a target and then back from the target to the surveying instrument, is determined. From the travel time, a distance from the surveying instrument to the target may be calculated. This calculation method may also be referred to as the time-of-flight method.

It will be appreciated however that determination of the distance by the surveying instrument 300 may not necessarily be performed using the time-of-flight method. Other techniques such as a method based on the detection of multiple frequency phase-shifts may also be used. In this case, the light transmitted from the surveying instrument (via the optical system), and then received at the surveying instrument after reflection at a target, may not be an optical pulse but rather a light beam. Thus, although it is sometimes referred in the embodiments described herein that optical pulses and the time-of-flight method are used for determination of the distance to a target, other measurements techniques may be employed.

The actuating member 370 may be responsive to temperature (and in particular to a temperature change) so as to induce a displacement of the optical component 330 relative to the chassis 320 along the optical axis 315 in response to a temperature change. As described with reference to FIGS. 1a and 1b, a temperature change may affect the position of the optical component 330 along the optical axis 315. This, in turn, may affect the amount of light captured by the optical component 330 and thus the amount of light detected at the receiver 380, which affects the dynamic range of the surveying instrument 300. In addition, the dynamic range of the surveying instrument may be affected because of changes in electronic components because of the temperature change.

In the present embodiment, a temperature driven translation stage is used to refocus the optics, and in particular to displace the optical component 330 along the optical axis 315.

In the embodiment shown in FIG. 3a, the optical stage 350 includes a movable part 360, which may be a movable arm arranged to swing about a hinge 355 which is close to the point of fixation 358 of the optical stage to the chassis 320, and an actuating member 370, which may be a bimetal sheet (or at least a plate whose bending depends on temperature). The bimetal sheet 370 may be arranged to extend along the movable arm 360. In the present example, the actuating member 370 extends from the extremity at which the optical stage (or a base of it) 350 is attached to the chassis 320 to the extremity of the movable arm 360 at which the optical component 330 is arranged.

The actuating member (or bimetal sheet) 370 may be arranged such that it is brought into contact with the movable arm 360. In the embodiment shown in FIG. 3a, the actuating member is pre-tensioned. The bending of the actuating member may change in response to a temperature change, thereby changing the force applied to the movable arm 360 and displacing the position of the optical component 330 along the optical axis 315. The motion direction of the actuating member may for example be verified before machining either by testing or by available characteristics of the material used for the actuating member. More generally, actuation is provided by a mechanical deformation of the actuating member 370 in response to the temperature change, thereby causing the displacement of the optical component 330 along the optical axis 315. Although the present example shows that it is the bending of the actuating member that is changed, other alternatives based on other mechanical deformations of the actuating member may be envisaged. The present example as shown in FIG. 3a, however, does provide a more stable and accurate displacement of the optical component 330 along the optical axis 315.

In the present example, the actuating member may include a bimetal, as mentioned above, but may more generally be any material including at least two thermally expandable layers of different materials.

Although FIG. 3a has been used to illustrate the receiving part (or receiving side) of the surveying instrument 300, it will be appreciated that the same Figure may be used to illustrate the transmitting part (or transmitting side) of the surveying instrument 300 with the receiver 380 being an optical light source configured to emit an optical light pulse which is guided via the optical fiber 335 to the optical fiber ferrule 330 mounted on the stage 350 including the movable part 360 and the actuating member 370. The optical fiber ferrule is mounted at the optical axis 315 along which the optical pulse emitted by the optical light source is transmitted from the surveying instrument 300.

With reference to FIG. 3b, a surveying instrument 301 with an alternative embodiment of a stage including an actuating member 371 and a movable part 361 providing a displacement of an optical component 330 such as an optical fiber ferrule is shown. Such a stage may be mounted at the chassis 320 of the surveying instrument 301.

FIG. 3b shows a surveying instrument 301 which may equivalent to the surveying instrument 300 described with reference to FIG. 3a except that it includes another type of stage. In this embodiment, the movable part is mounted on a track on which it is arranged to glide (as illustrated by the wheel of element 361). The track may extend along the optical axis 315 such that a displacement of the movable part 361 along the optical axis 315 induces a motion of the optical fiber ferrule 330 along the optical axis 315. In this embodiment, instead of a spring, the actuating member is helicoidally shaped (or has a spiral form). The actuating member 361 may for example be made of a bimetal or at least a material which, upon a temperature change, results in a compression or an extension of the helicoidally formed actuating member 371 attached to the movable part 361 such that the movable part 361 is either pulled towards the actuating member 371 or pushed from the actuating member 361.

With reference to FIGS. 4a and 4b, an optical stage 400 according to some embodiments is described.

FIGS. 4a and 4b provide three-dimensional views at two different view angles of the same optical stage 400. The optical stage 400 may be equivalent to the optical stage 350 described with reference to FIG. 3a. The optical stage 400 shown in FIGS. 4a and 4b may replace the optical stage 350 in the surveying instrument 300 schematically illustrated in FIG. 3a.

The optical stage 400 includes a movable part 460 and an actuating member 470. The optical stage 400 includes also a base 405 which is L-shaped, i.e. comprising a first block extending along a first direction (standing block in FIGS. 4a and 4b) and a second block extending along a second direction (e.g. horizontally as in FIGS. 4a and 4b) which is intersecting (and in particular substantially perpendicular to) the first direction. The two blocks are joined together or may also be a single piece to form the L-shaped base 405.

The base 405 (e.g. the standing block) may be fixed at a wall of a chassis (not shown in FIGS. 4a and 4b) of a surveying instrument. The base 405 is therefore the fixed part of the optical stage 400.

The optical stage may also include a hinge 455 securely attached (or at least connected) to the base 405, in particular the standing (or vertical) block in FIGS. 4a and 4b. The optical stage also includes a movable arm 460 being arranged to swing on the hinge 455 upon actuation by the actuating member 470. The movable arm 460 may be a block extending from the hinge 455 along the second block of the base 405 (the block extending horizontally, and in FIGS. 4a and 4b substantially perpendicularly to the first standing block of the base). The movable arm 460 may however not be in contact with the second block so that it can swing (i.e. be hanging freely in this direction) on the hinge 455.

The actuating member 470 may be a plate extending along the arm 460 and may be equivalent to the movable part 370 described with reference to FIG. 3a. The actuating member or plate 470 may include an opening 472 for connecting an optical fiber to an optical component 430 attached to the movable arm 460.

As mentioned above, parameters of the actuating member may be calibrated to determine the amount of displacement of the optical component along the optical axis in response to a temperature change. In particular, the choice of material (should it be a bimetal, a trimetal, a tetrametal and the selection of the materials for forming those), the design and/or the dimensions of the actuating member may be selected to achieve a displacement of a certain number of micrometers per degree Celsius. In particular, the size of the opening for introducing an optical fiber may be adjusted.

The actuating member 470 may be arranged to engage with the movable part 460 at at least one contact point 465. The actuating member 470 may extend between a first extremity 406 being securely attached to the (first block of the) base 405 of the stage 400 and the contact point 465.

In some embodiments, the actuating member 470 may be arranged to permanently apply a force on the movable arm 460. For this purpose, the movable arm may include an indentation or protuberance 465 such that it is permanently brought in contact with the actuating member 470.

With reference to FIG. 5, the motion provided by an actuating element in an optical stage such as the optical stage 400 described with reference to FIGS. 4a and 4b according to some embodiments is described.

FIG. 5 shows a rotation center 506, which may correspond to the hinge 455 in the optical stage 400 described with reference to FIGS. 4a and 4b and a motion 590 resulting from the swing of a movable arm about the rotation center 506. The extremity of the movable arm has been moved by an angle α. As the extremity is located far away from the rotation center, the resulting displacement may be considered to be (at least almost) linear. Referring again to FIGS. 4a and 4b, the optical component 430 may be mounted on the movable arm 460 of the stage 400 in proximity to the contact point at which the actuating member applies a force to cause the displacement of the movable arm 460.

With reference to FIG. 6, a surveying instrument according to some embodiments is illustrated.

FIG. 6 shows a schematic view of a surveying instrument 600 including an optical light source 640. The optical light source 640 may be configured to emit an optical light pulse directed to a first optical ferrule 644 by transmission via a first optical fiber 642. The optical pulse may then exit the surveying instrument 600 via a first front lens assembly 648. The optical pulse 646 may be directed towards a target (not shown) at which the received optical pulse of light is reflected.

Concurrently to emitting the optical pulse 646 from the surveying instrument 600 towards a target, an optical reference pulse is sent to a receiver 680 of the surveying instrument for determining the emission time of the optical pulse sent to the target.

The reflected optical pulse 616 may then return back to the surveying instrument and enter at a second front lens assembly 610 which may be configured to direct the received optical pulse 616 at a second optical fiber ferrule 630. The second optical fiber ferrule 630 is connected to the receiver 680 via a second optical fiber 682 such that it is detected at a photodetector of the receiver 680. The receiver (or a processor of the receiver) 680 may then be configured to measure a time period between emission of the optical light pulse 646 from the light source 640 and reception of the optical light pulse 616 at the receiver 680. The processor may then be configured to determine a distance based on the measured time period. It will be appreciated that although in FIG. 6 the receiver is depicted to also include, or function as, a processor to determine the distance (e.g. based on time-of-flight calculation, as described herein), in other embodiments, the processor may be a separate entity receiving an electrical signal corresponding to the optical reference pulse associated with the emitted optical pulse 646 and another electrical signal corresponding to the received optical pulse 616.

At least the first optical ferrule 644, the second optical ferrule 630 and the optical lenses 648 and 610 may be arranged within a chassis 620 of the surveying instrument 600. As depicted in FIG. 6, the light source 640, the receiver 680 and the optical fibers 642 and 682 may also be arranged within the chassis 620.

While the position of the first optical fiber ferrule 644 may be fixed relative to the chassis 620 of the surveying instrument 600, the position of the second optical ferrule 630 receiving the reflected optical pulse 616 via the optical lens 610 may be mounted on a stage 660 for being displaced along the optical axis 615 of the optical lens 610 upon a temperature change. The optical stage may correspond to, and function as, any of the optical stages described above with reference to FIGS. 2, 3*a*, 3*b*, 4*a*, 4*b* and 5.

It will be appreciated however that the first optical fiber ferrule 644 may also be mounted on a stage for being displaced along the optical axis of the first front lens assembly 648. Such a stage may be equivalent to any of the optical stages described above with reference to FIGS. 2, 3*a*, 3*b*, 4*a*, 4*b* and 5.

A geodetic instrument 700 according to some embodiments is described with reference to the schematic illustration shown in FIG. 7.

In FIG. 7, the geodetic instrument 700, which may be e.g. a total station or another instrument for surveying, includes a base 725, an alidade 715 and a center unit 705. The center unit 705 has an instrument optical axis or line of sight 710 for pointing towards a target. The center unit 705 may be mounted on the alidade 715 for rotation about a first (trunnion) axis 720. The alidade 715 may be mounted on the base 725 for rotation about a second (azimuthal) axis 730 orthogonal to and intersecting the first (trunnion) axis 720, such that the instrument optical axis 710 is rotatable about a rotation point (not shown in FIG. 7).

The geodetic instrument 700 may further include all or some of the functional components described earlier with reference to FIGS. 2, 3*a*, 3*b*, 4*a* and 4*b*, and in particular the optical stages 350, 400 for mounting of an optical component. In an exemplifying embodiment, the optical stage and the optical component (not shown in FIG. 7) may be arranged in the center unit 705. The geodetic instrument 700 may initially rotate its instrument optical axis 710 such that it points towards a target (or, more specifically, towards a point or region on a target). Then, the geodetic instrument 700 may perform a method according to the present disclosure for determining a distance to the target. After the distance is determined, the geodetic instrument 700 may rotate its instrument optical axis 710 to point towards a next target (or a next point or region on the target), and a next distance may be determined. The direction (or angle) of the optical axis or line of sight 710 may be adjusted by rotating either one of the alidade 715 or the center unit 705 or by adjusting an optical component (such as a scanning mirror or other deflecting element, not shown) of the center unit 705 and/or by any combination thereof. The geodetic instrument 700 may for example continue to repeat such a procedure until e.g. a mapping of one or many targets has been performed.

By integrating an optical stage such as those described with reference to FIGS. 2, 3*a*, 3*b*, 4*a* and 4*b*, the dynamic range of the geodetic instrument is more stable, thereby improving the performance of the geodetic instrument in terms of accuracy and reliability. Referring to FIGS. 3*a*, 3*b* and 7, the optical system 310, the stage 350 and the optical component 330 may be arranged within the center unit 705 having a chassis 320. The optical system 310 may for example include the front lens 708 of the center unit 705.

It will be appreciated however that in some other embodiments, the stage 350 may be arranged in the alidade 715, depending on the location of the optical component for which compensation (via the stage) is to be provided.

Although the present invention has been described with reference to detailed examples, the detailed examples only serve to provide the skilled person with a better understanding, and are not intended to limit the scope of the invention. The scope of the invention is much rather defined by the appended claims.

Additionally, variations to the disclosed embodiments can be understood and effected by the skilled person in practicing the claimed invention, from study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A surveying instrument comprising:
   a chassis;
   an optical system having an optical axis, the optical system being adapted to receive or transmit light;
   an optical component located at said optical axis, the received or transmitted light passing through said optical component; and
   a stage attached to said chassis, the stage including an actuating member arranged to act on the optical component for movement thereof;
   said actuating member being responsive to temperature so as to induce a displacement of the optical component relative to the chassis along the optical axis in response to a temperature change;

wherein actuation by the actuating member is caused by a mechanical deformation of the actuating member in response to said temperature change, thereby causing the displacement of said optical component;

wherein the stage further comprises a movable part, the optical component being attached to the movable part and the actuating member being arranged to act on the movable part for movement thereof; and wherein the stage includes a base with a flexible section securely attached to the base of the stage, the movable part being an arm arranged to swing on said flexible section upon actuation by said actuating member.

2. The instrument of claim 1, further comprising a receiver configured to receive the received light via said optical component and/or an optical light source configured to emit light to be transmitted via said optical component.

3. The instrument of claim 1, wherein the mechanical deformation is at least one of a bending or an expansion of the actuating member.

4. The instrument of claim 1, wherein the actuating member is a plate extending along said arm.

5. The instrument of claim 1, wherein the optical component is mounted on the movable part in proximity to at least one contact point at which the actuating member engages with the movable part.

6. The instrument of claim 1, wherein the actuating member is arranged to permanently apply a force on the movable part or vice versa.

7. The instrument of claim 1, wherein said actuating member includes at least one of a bimetal, a trimetal, a tetrametal, or an arrangement including at least two thermally expandable elements of different materials.

8. The instrument of claim 1, wherein the optical component is an optical fiber ferrule to which an optical fiber is connected for receiving and/or transmitting light.

9. The instrument of claim 8, wherein the optical fiber ferrule is configured to establish an optical connection between the optical system and a transmission line, or optical waveguide, transmitting light received at the optical system to a receiver or light transmitted from the optical light source to the optical system.

10. The instrument of claim 1, wherein parameters of the actuating member are calibrated to determine the amount of displacement of said optical component along the optical axis in response to a temperature change.

11. The instrument of claim 10, wherein the parameters include at least one of material and dimensions of said actuating member.

12. The instrument of claim 1, further comprising a processor configured to determine a distance based at least on the received light.

13. The instrument of claim 1, wherein the surveying instrument further comprises an alidade, a base and a center unit having said chassis and being mounted on the alidade for rotation about a first axis, said alidade being mounted on the base of the surveying instrument for rotation about a second axis intersecting the first axis, and the optical system, the stage and the optical component being arranged within said center unit.

14. A surveying instrument comprising:
a chassis;
an optical system having an optical axis, the optical system being adapted to receive and transmit light;
an optical component aligned with said optical axis, the received and transmitted light passing through said optical component; and
a stage attached to said chassis, the stage including an actuating member arranged to act on the optical component for movement thereof;
said actuating member being responsive to temperature so as to induce a displacement of the optical component relative to the chassis along the optical axis in response to a temperature change;
wherein actuation by the actuating member is caused by a mechanical deformation of the actuating member in response to said temperature change, thereby causing the displacement of said optical component;
wherein the stage further comprises a movable part, the optical component being attached to the movable part and the actuating member being arranged to act on the movable part for movement thereof; and
wherein the stage includes a base with a flexible section securely attached to the base of the stage, the movable part being an arm arranged to swing on said flexible section upon actuation by said actuating member.

15. The instrument of claim 14, wherein the mechanical deformation is at least one of a bending or an expansion of the actuating member.

16. The instrument of claim 14, wherein the actuating member is a plate extending along said arm.

17. The instrument of claim 14, wherein the surveying instrument further comprises an alidade, a base and a center unit having said chassis and being mounted on the alidade for rotation about a first axis, said alidade being mounted on the base of the surveying instrument for rotation about a second axis intersecting the first axis, and the optical system, the stage and the optical component being arranged within said center unit.

18. A surveying instrument comprising:
a chassis;
an optical system having an optical axis, the optical system being adapted to receive or transmit light;
an optical component aligned with said optical axis, the received or transmitted light passing through said optical component; and
a stage attached to said chassis, the stage including an actuating member arranged to act on the optical component for movement thereof;
said actuating member being responsive to temperature so as to induce a displacement of the optical component relative to the chassis along the optical axis in response to a temperature change;
wherein actuation by the actuating member is caused by a mechanical deformation of the actuating member in response to said temperature change, thereby causing the displacement of said optical component;
wherein the stage further comprises a movable part, the optical component being attached to the movable part and the actuating member being arranged to act on the movable part for movement thereof; and
wherein the stage includes a base with a flexible section securely attached to the base of the stage, the movable part being an arm arranged to swing on said flexible section upon actuation by said actuating member.

19. The instrument of claim 18, wherein the actuating member is a plate extending along said arm.

20. The instrument of claim 18, further comprising a receiver configured to receive the received light via said optical component and/or an optical light source configured to emit light to be transmitted via said optical component.

* * * * *